United States Patent [19] [11] Patent Number: 5,189,983
Aitchison [45] Date of Patent: Mar. 2, 1993

[54] POULTRY HOUSE CONFINEMENT RING SYSTEM AND METHOD

[76] Inventor: David Aitchison, HCR 63, Box 263, Ozark, Ark. 72949

[21] Appl. No.: 876,571

[22] Filed: Apr. 30, 1992

[51] Int. Cl.$^5$ ............................................. A01K 31/18
[52] U.S. Cl. ............................................. 119/31
[58] Field of Search ........................ 119/31, 32, 33, 34

[56] References Cited

U.S. PATENT DOCUMENTS

| | | | |
|---|---|---|---|
| 1,839,575 | 1/1932 | Miller | 119/31 |
| 2,123,671 | 7/1938 | Du Bois | 119/33 |
| 2,385,682 | 9/1945 | Burkholder | 119/34 |
| 2,909,152 | 10/1959 | Cordis | 119/31 |
| 2,923,273 | 2/1960 | Collins | 119/20 |
| 3,095,855 | 7/1963 | Mead | 119/20 |
| 4,151,811 | 5/1979 | Trvhan | 119/33 X |
| 4,278,423 | 7/1981 | Siccardi | 432/222 |
| 4,369,030 | 1/1983 | Siccardi | 432/37 |
| 4,524,722 | 6/1985 | Siccardi | 119/21 |

Primary Examiner—John J. Wilson
Assistant Examiner—Thomas Price
Attorney, Agent, or Firm—R. R. Keegan Law Firm

[57] ABSTRACT

A poultry house ring confinement system and method which utilizes permanent, reusable, brooder rings in place of the conventional, temporary and disposable brooder confinement structures. The brooder confinement rings of the present invention are raised and lowered between an inoperative storage position adjacent the ceiling of a brooder house and an operative lower position on the floor of the brooder house by winch, pulley and cable arrangements. The brooder confinement rings and method of the present invention provides for quick poultry house set-up and tear down, and allows the brooder rings to be cleansed and disinfected when the brooder house is cleaned and disinfected at the end of each brooder cycle. In accordance with an exemplary embodiment of the present invention, each of the brooder rings is dimensioned to accommodate two brood heaters, and enough feeders and waterers to support about eight hundred chicks. Each brooder ring includes cutouts on opposing sides of the ring for accommodating a feed line. Cover plates are used to cover any remaining openings to insure that chicks do not exit the rings. Each of the brooder rings is constructed of galvanized steel having a baked-on enamel coating on both the interior and exterior surfaces. The interior surface of each of the brooder rings is a light reflective color which serves to optimize the heating effect of the brood heaters by reflecting the heat therefromm and thereby reduce the amount of fuel required to operate the brood heaters.

27 Claims, 9 Drawing Sheets

POULTRY HOUSE CONFINEMENT RING SYSTEM AND METHOD

BACKGROUND OF THE INVENTION

This invention relates to poultry houses for raising domesticated fowl and, more particularly, concerns a poultry house ring confinement system and method for raising young domesticated turkeys.

Typically, domesticated turkeys are raised commercially by hatching the chicks at a hatchery, transporting the one-day-old chicks to brooder houses holding, for example, twenty-one thousand chicks per brooder house, and brooding these chicks for about six weeks. Next, the brooded chicks are transferred to confinement houses where the hens are kept for about fourteen weeks or until the hens reach about fourteen pounds each and the toms are kept for about sixteen weeks or until the toms reach approximately twenty-four pounds each. Then, the hens and toms are transferred to a poultry processing plant where they are readied for market.

Conventional brooder houses contain a large number of brood heaters, one or more feed lines, and a large number of watering devices. The brood heaters, feed lines, and watering devices are attached to cables which are driven by winches in the ceiling of the brooder house for raising and lowering these items between raised storage positions up near the ceiling of the house and lowered operative positions near or on the floor of the house.

The brood heaters are kept very close to the floor so as to be close to the young turkeys during the first six to eight days of the brood cycle in order to keep the young chicks alive. During the warm summer months, the brood heaters can be shut off and raised to an inoperative stored position up near the ceiling of the house after about the first six or eight days of brooding. During the colder months, the brood heaters are operated as space heaters and raised to about one or more feet from the house floor during the remaining five weeks of brooding. A typical brooder house, for example, 450 feet in length and 40 feet in width would include two rows of brood heaters, each row including twenty-six heaters, and extending along the length of the house.

For the first six to eight days of brooding, young turkeys are customarilay kept close to the brood heaters by temporary brooder confinement structures constructed of either cardboard or masonite. Such conventional brooder confinement structures are, for example, cardboard ring-like structures having curved ends which prevent the young chicks from bunching up in a corner. These conventional brooder confinement structures are temporary and disposable in as much as they are constructed on site for use during the first six to eight days of brooding and then thrown away. Set up of these temporary disposable brooder confinement structures is time-consuming and requires that the set up of a brooder house takes, for example, four or more hours for a brooder house having a total of fifty-two brood heaters requiring twenty-six of these structures to be constructed and set up around the other brood house equipment.

A typical brooder house set up scenario would include first raising all the brood heaters, watering equipment, and feed lines up toward the ceiling of the house, applying a layer of particulate matter, such as saw dust, on the floor of the brooder house, lowering the feed lines to their operative position on the covered floor of the house, lowering the waterers to their operative position on the covered floor of the house, lowering the brood heaters to their operative position near the covered floor of the house, constructing in situ a number of brooder confinement structures, each structure surrounding one or more brood heaters and as many feeders and waterers as possible. In six to eight days, each of these temporary brooder confinement structures must be removed from the brooder house and disposed of. The removal of these structures is time consuming and takes approximately three or more hours.

As such, the conventional brooder process involving the use of conventional temporary brooder confinement structures which are only used during the first six to eight days of a single brooder cycle is time consuming, wasteful, and costly in that new temporary brooder confinement structures are constructed during each brooder cycle. Attempts at washing and disinfecting these brooder confinement structures for storage and reuse have been to no avail since structures made of cardboard or masonite are not adapted for easy and effective cleaning and do not transport and store well due to their flimsy and weak structure.

In light of the foregoing, the need exists for an improved brooder house system and method which is quickly set up and dismantled, is easily cleansed and disinfected, and does away with conventional temporary brooder confinement structures.

SUMMARY OF THE INVENTION

In accordance with the present invention, a brooder house ring confinement system and method is provided which utilizes permanent, reusable, brooder rings in place of the conventional, temporary and disposable brooder confinement structures. The brooder confinement rings of the present invention are raised and lowered between an inoperative storage position adjacent the ceiling of a brooder house and an operative lower position on the floor of the brooder house by which, pulley and cable arrangements. The brooder confinement rings and method of the present invention provides for quick poultry house set up and tear down, and allows the brooder rings to be cleansed and disinfected when the brooder house is cleaned and disinfected at the end of each brooder cycle.

In accordance with an exemplary embodiment of the present invention, each of the brooder rings is dimensioned to accommodate two brood heaters, and enough feeders and waterers to support about eight hundred chicks. Each brooder ring includes cutouts on opposing sides of the ring for accommodating a feed line. Cover plates are used to cover any remaining openings to insure that chicks do not exit the rings.

In accordance with a preferred embodiment of the present invention, each of the brooder rings is constructed of galvanized steel which has a baked-on enamel coating on both the interior and exterior surfaces. As such, the rings are structurally sound and easily cleansed and disinfected for reuse. The interior surface of each of the brooder rings is a light reflective color which serves to optimize the heating effect of the brood heaters by reflecting the heat therefrom and thereby, reduce the amount of fuel required to operate the brood heaters.

A principal object of the present invention is the provision of a poultry house brooder ring system and method which provides permanent, reusable brooder rings. Another object of the present invention is the provision of a brooder system and method which provides for quick brooder house set up, quick brooder ring removal, and which facilitates the cleansing and disinfecting of the brooder rings for reuse. A still further object of the present invention is the provision of a brooder ring which has an interior surface that reflects heat and in so doing serves as an energy-saving device in connection with the brood heaters.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

In accordance with an exemplary embodiment of the present invention as shown schematically in FIGS. 1-5 of the drawings, a brooder house for raising young domesticated turkeys is generally designated by the reference number 10 and shown to include a floor 12 supporting a plurality of trusses 14 which in turn support lower and upper side walls 16 and 18 and a roof 20. Suspended from the trusses 14 are first and second feed lines 22 and 24, two rows of confinement rings 26 and 28, first and second rows of brood heaters 30 and 32, and rows of waterers or drinkers 34 and 36. FIGS. 1-5 are schematic in that the cables, pulleys, and winches attached to each of the feed lines, confinement rings, brood heaters and waterers, and used for raising and lowering this equipment are not shown for the sake of clarity. Also, FIGS. 1-5 are schematic in that conventional poultry house equipment such as ventilation fans, ceiling fans, windows, and doors are also not shown. It should be understood, that FIGS. 1-5 depict a view of a poultry house which one would have if they were standing near the center of the poultry house and looking toward one end. This view highlights the fact that the equipment in the poultry house is set up in a substantially symmetrical mirror image arrangement with the line of symmetry extending along the center of the poultry house.

Figure 1:
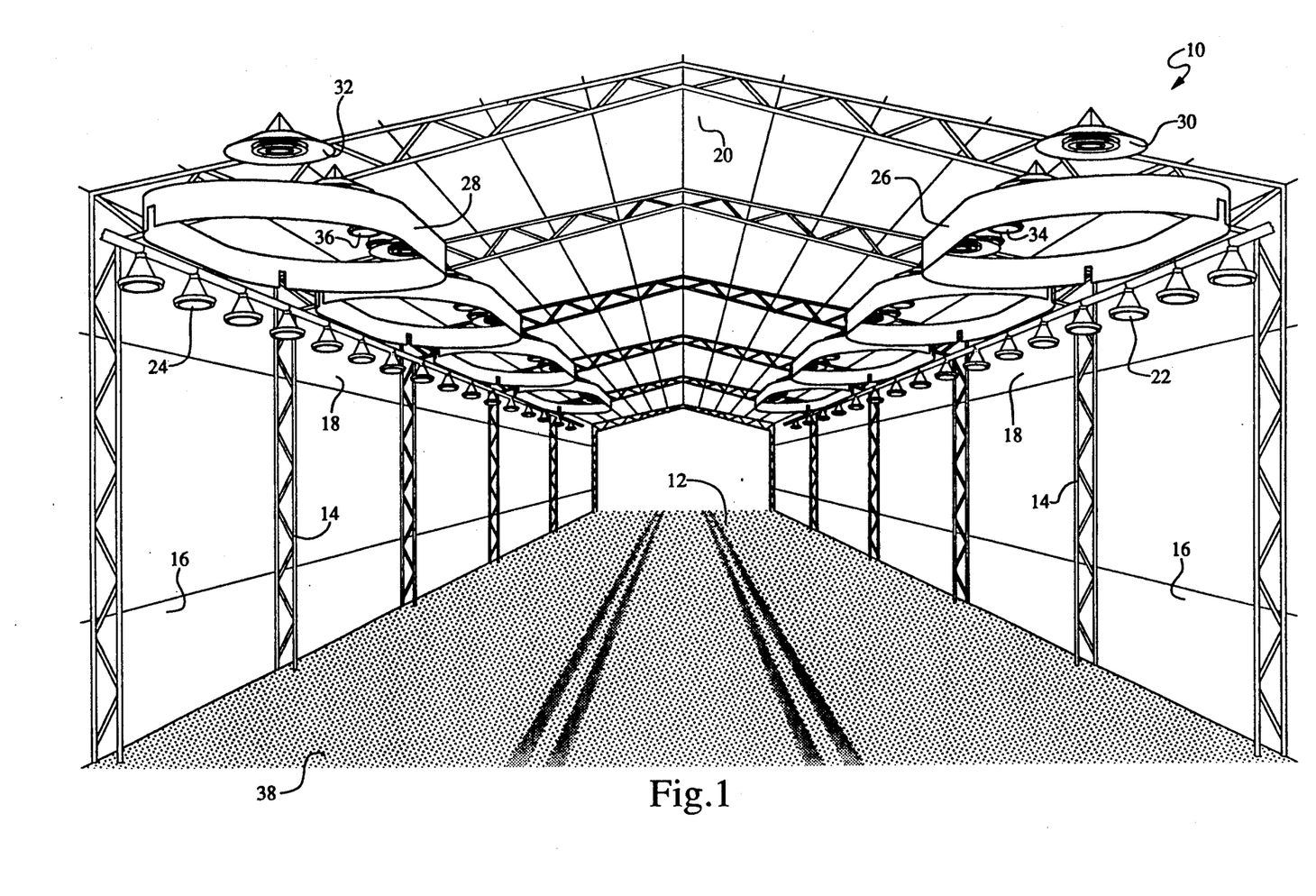
FIG. 1 is a schematic perspective illustration of a portion of a poultry house in accordance with an exemplary embodiment of the present invention.

With reference again to FIG. 1 of the drawings and in accordance with one embodiment of the present invention, a preferred poultry house set-up process begins with the interior of the poultry house and all the equipment, such as feed lines, confinement rings, brood heaters, and waterers being cleansed and sanitized and, as such, ready for the next brooder cycle. Next, a layer 38 of clean particulate matter, for example, saw dust, is spread over the floor 12. With the equipment raised up near the ceiling as shown in FIG. 1, there is ample vertical space within the poultry house for accommodating movement of a tractor or other equipment along the length of the house. As such, the confinement ring arrangement of the present invention allows for the use of conventional poultry house equipment.

Figure 2:
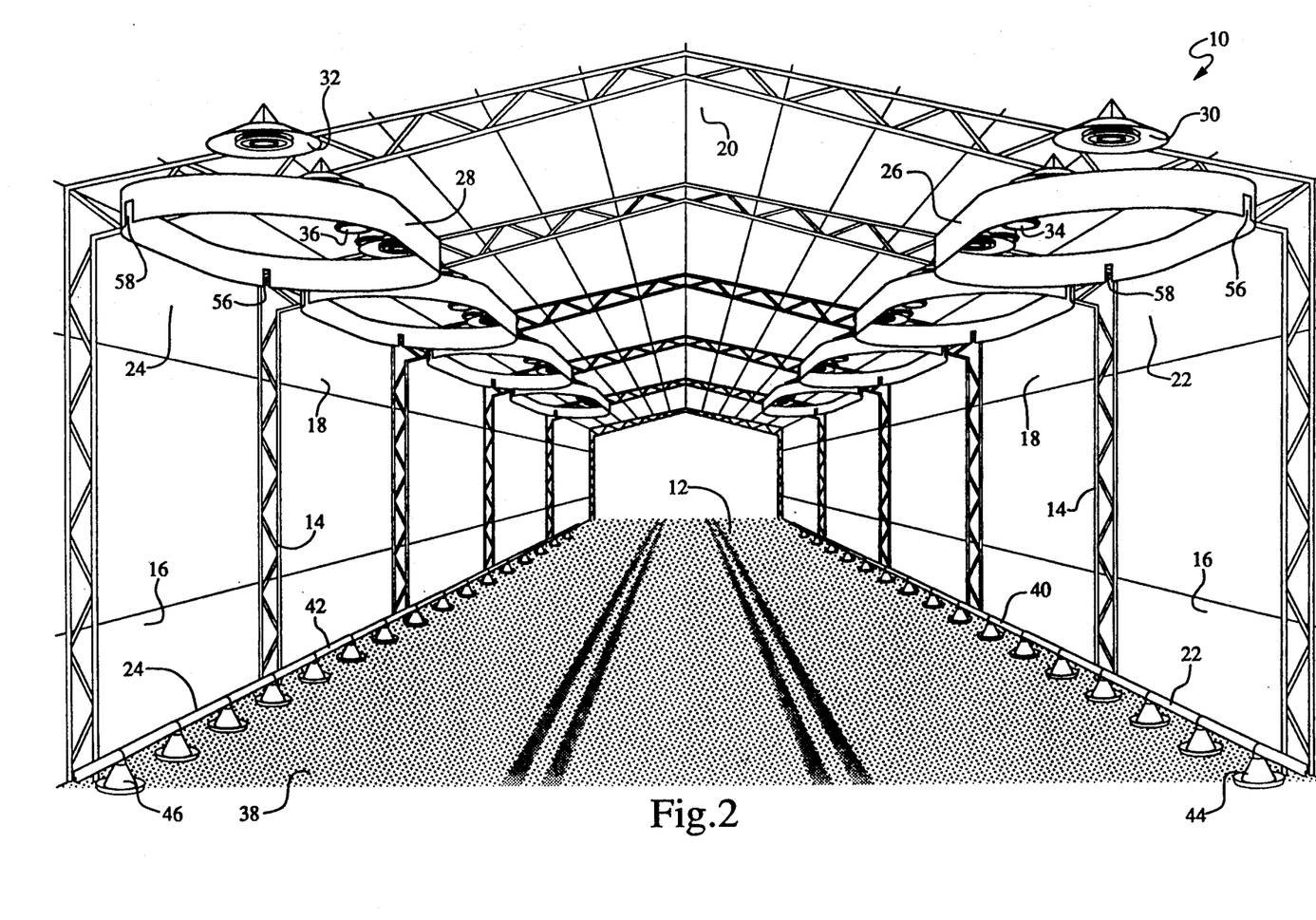
FIG. 2 is the same as FIG. 1 except that the feed lines have been lowered to the poultry house floor.

As shown in FIG. 2 of the drawings, the next step in the poultry house set-up process is lowering of the feed lines 22 and 24 to the poultry house floor 12. Each of the feed lines 22 and 24 includes in a conventional fashion a feed conduit or tube 40 and 42 and a plurality of feed trays 44 and 46.

Figure 3:
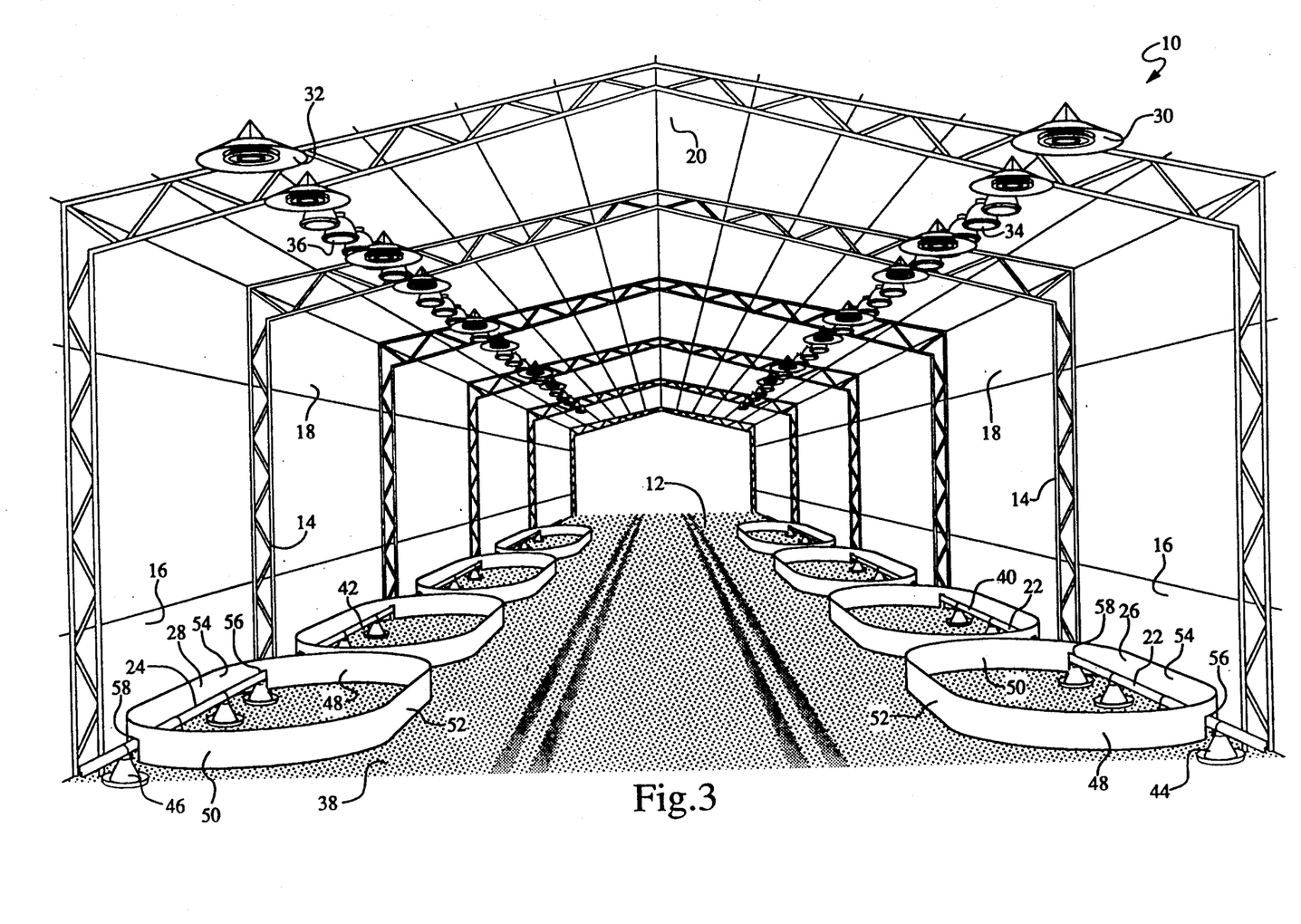
FIG. 3 is the same as FIG. 2 with the exception of the confinement rings of the present invention being lowered to the poultry house floor.
Figure 4:
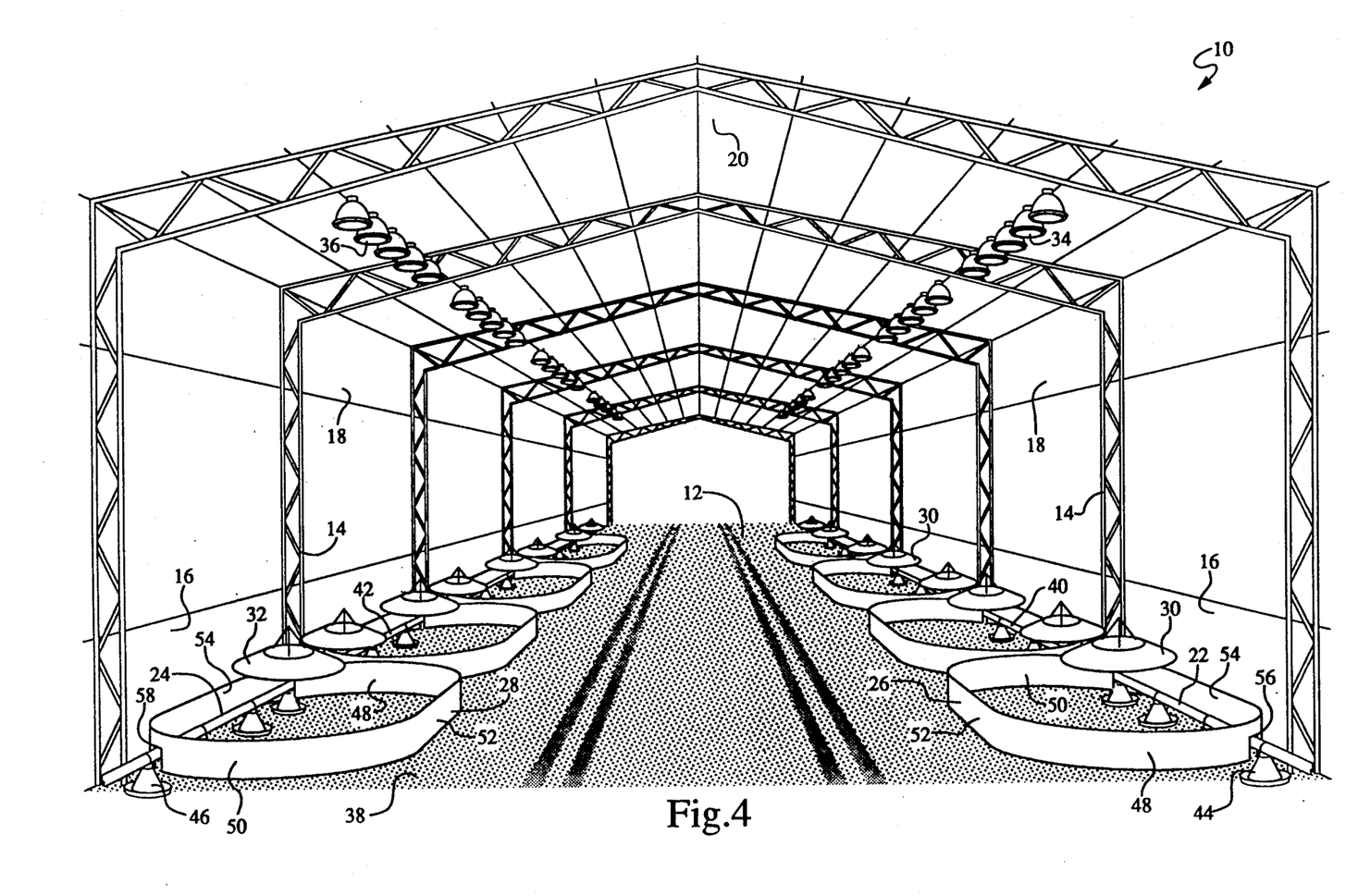
FIG. 4 is the same as FIG. 3 except that the brood heaters have been lowered to an operative position.

As illustrated in FIG. 3 of the drawings, the next step in the brooder house set-up sequence involves lowering the rows of confinement or brooder rings 26 and 28 to the poultry house floor 12. Each of the confinement rings 26 and 28 has semi-circular ends 48 and 50 connected by straight sides 52 and 54. Further, each of the confinement rings includes cut-outs or notches 56 and 58 in the ends 48 and 50. The ring notches 56 and 58 accommodate the feed tubes 40 and 42 of the feed lines 22 and 24. Each of the confinement or brooder rings of the first row of rings 26 is substantially the same as each of the rings in the second row of rings 28 except that the rings of one row are rotated 180° relative to those of the other row. After the brooder rings have been lowered down over the feed tubes 40 and 42, the lower portion of each of the cut-outs 56 and 58 is covered with a cover plate 60 (FIG. 11) so that the young chicks are not allowed to escape from the confinement ring during brooding. Each of the confinement rings of the rows 26 and 28 surrounds a plurality of feed trays 44 and 46 extending from the feed lines 22 and 24, respectively.

With reference again to FIG. 4 of the drawings, the next step in the brooder house set-up process is the lowering of the first and second rows of brood heaters or stoves 30 and 32 to an operative brood heating position down near the confinement rings 26 and 28. In accordance with this exemplary embodiment, there are two brood heaters associated wich each confinement ring. Although not shown for sake of clarity, it is to be understood that each of the brood heaters 30 and 32 would have natural gas or LP supply lines providing natural gas or LP to each of the brood heaters from a supply source, such as a propane tank.

Figure 5:
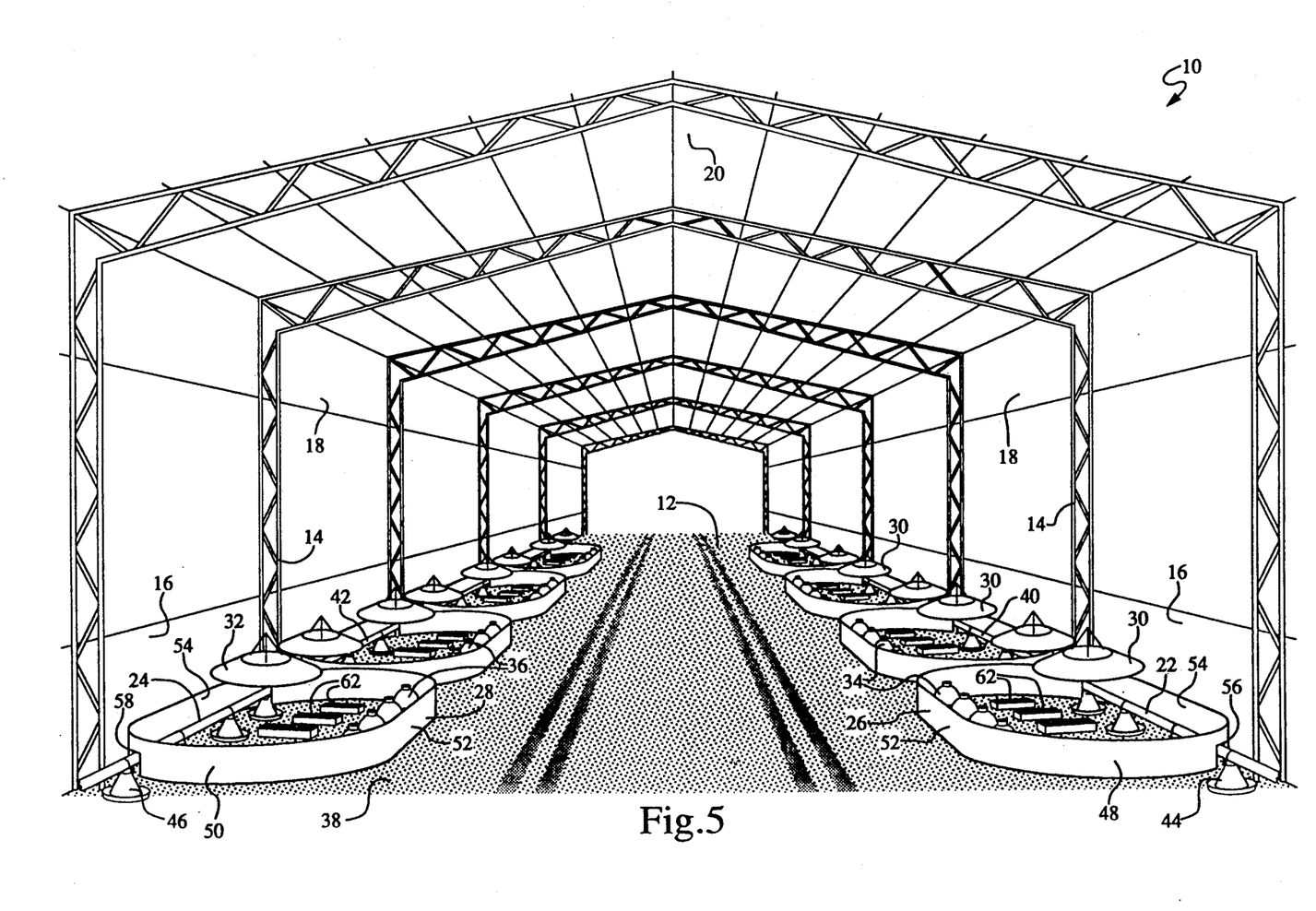
FIG. 5 is the same as FIG. 4 except that the waterers have been lowered to the poultry house floor and a plurality of hand-filled feed trays have been added to each of the confinement areas.

As represented in FIG. 5 of the drawings, the final step in the brooder house set-up process of the present invention involves lowering the two rows of waterers 34 and 36 down into position on the brooder house floor 12. Hand-filled feed trays 62 may be added within the confines of the rings 26 and 28 so as to provide additional feed for the young chicks. In a conventional fashion, each of the waterers or drinkers 34 and 36 includes a water supply conduit (not shown) leading from a water source to each of the watering units.

With reference to the exemplary embodiment of FIGS. 1-5 of the drawings, it is contemplated that the confinement ring system and method of the present invention is applicable to both full house brooding (as shown) and partial house brooding where only a portion of a poultry house is dedicated to brooding chicks. The number and size of the confinement rings is dictated in part by the number of chicks to be brooded, the arrangement of the other equipment (heaters, feeders, drinkers) in the poultry house, and the spacing between and location of the trusses as will be described in more detail below. For example, smaller and truly circular brooder rings may be used in connection with only one brood heater, one or more feeders, and one or more waterers. Although in the exemplary embodiment of FIGS. 1-5 there are shown two feed lines, two rows of heaters, and two rows of waterers, it is to be understood that the present invention encompasses the utilization with other equipment arrangements as shown, for example, in FIGS. 6-9.

With reference again to FIG. 5 of the drawings, the brooder house is ready for addition of day old turkey chicks to each of the confinement rings of rows 26 and 28. Therein, the chicks are brooded for six to eight days which is sufficient time to allow the chicks to grow to a size where they can survive without being confined closely to each of the brood heaters. At the end of this initial brooding period, plywood partitions are set up to separate the brood house into four separate brooding sections and then the cover plates 60 at each of the notches 56 and 58 in the confinement rings of rows 26 and 28 are removed and the confinement rings are raised to the inoperative raised position shown in FIG. 1. The feed lines, waterers, brood heaters, and feed trays are left in their operative positions on or near the poultry house floor for the remaining six to eight weeks of the brooding cycle. During the brooding cycle, the first and second rows of brood heaters 30 and 32 are raised or lowered in a conventional manner to adjust for ambient outside temperatures and to maintain the chicks at a substantially constant brooding temperature.

With reference again to FIGS. 4 and 5 of the drawings, it may not be necessary to lower all of the waterers of rows 34 and 36 to the poultry house floor since some of the waterers may fall outside the confines of the confinement rings 26 and 28. It is only necessary to lower the waterers which will be located within the confinement rings and as such provide water to the young chicks during the initial brooding cycle. After the confinement rings have been raised at the end of the initial six to eight days of brooding, the remaining waters of rows 34 and 36 are lowered to the poultry house floor to provide water over a larger area. It is preferred that the confinement rings of rows 26 and 28, brood heaters of rows 30 and 32, waterers of rows 34 and 36, and feed lines 22 and 24 are all suspended on separate cable and winch arrangements so that they can be raised and lowered independent of one another. Even though the rings and feed lines have separate winch cable and pulley arrangements, the confinement rings must be raised before the feed lines can be raised since the feed tubes 40 and 42 extend along the length of the poultry house.

Figure 6:
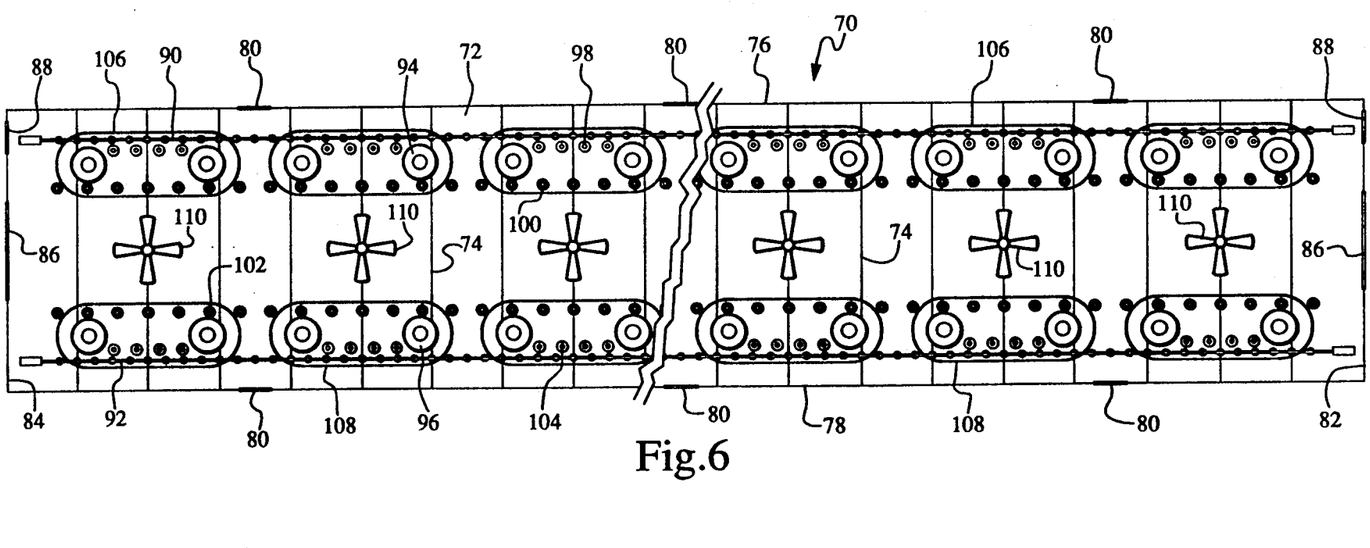
FIG. 6 is a schematic top view representation of a brooder house in accordance with one embodiment of the present invention.
Figure 7:
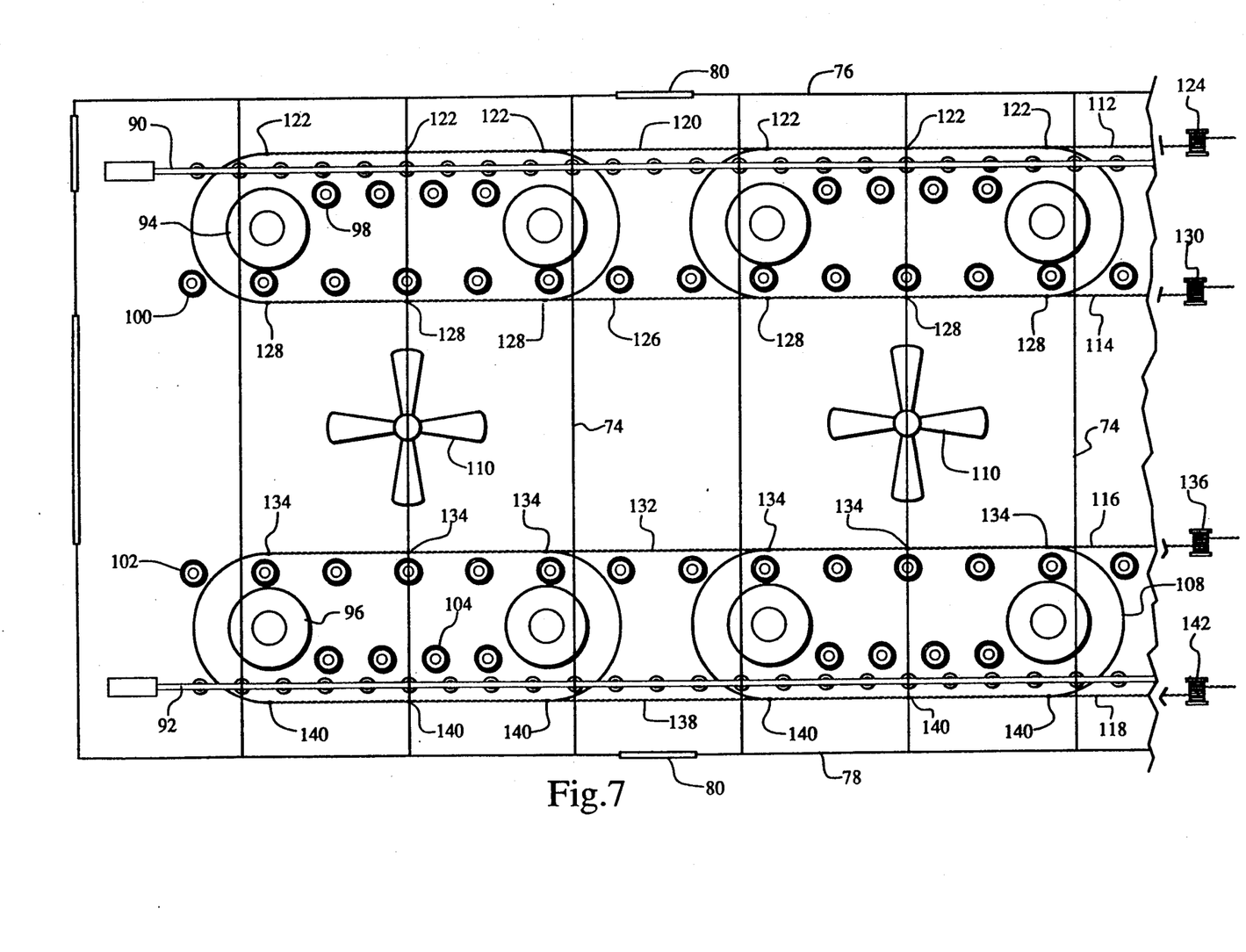
FIG. 7 is an enlarged illustration of one section of FIG. 6.

As shown in FIGS. 6 and 7 of the drawings and in accordance with one embodiment of the present invention, a poultry house generally designated by the reference numeral 70 is shown to include a floor 72 supporting a plurality of steel trusses 74 mounted on ten foot centers. The trusses 74 support side walls 76 and 78 and a roof which is not shown. Each of the side walls 76 and 78 extends for approximately four hundred-fifty feet and includes a plurality of forty-eight inch wall fans 80. The poultry house 70 further includes forty foot end walls 82 and 84 having twelve foot track doors 86 and one or more walk through doors 88.

Suspended from trusses 74 are first and second feed lines 90 and 92, first and second rows of brood heaters 94 and 96 having twenty-six brood heaters in each row, four rows of drinkers 98, 100, 102 and 104, first and second rows of brooder rings 106 and 108, and a plurality of ceiling fans 110. Although not shown in FIGS. 6 and 7, it is to be understood that each of the feed lines, rows of brood heaters, and rows of drinkers is supported by a conventional cable, pulley and winch arrangement having the winches mounted on the ceiling of the poultry house, the pulleys mounted on respective trusses, and drop cables extending down to the respective equipment.

As illustrated in FIG. 7 of the drawings, the first row of brooder rings 106 is suspended from the trusses 74 by separate low side and high side cable, pulley and winch arrangements 112 and 114. Likewise, the second row of confinement rings 108 is suspended from the trusses 74 by respective high side and low side winch, cable and pulley arrangement 116 and 118. The low side cable arrangement 112 is referred to as a low side cable arrangement since it is located near the side wall 76 and as such in the area of the poultry house having a lower ceiling height.

Low side cable arrangement 112 includes a 3/16 inch steel main cable 120, three ⅛ inch steel drop cables 122 per confinement ring 106, and a winch 124. Preferably, the winch 124 is mounted near the center of the poultry house 70 with main cables extending from each side thereof. The high side cable arrangement 114 includes a 3/16 inch steel main cable 126, three ⅛ inch steel drop cables 128 attached to one side of each of the confinement rings 106, and a winch 128 for feeding out and reeling in the main cable 126. The winches 124 and 130 are mounted on the ceiling of the poultry house and each of the drop cables 122 and 128 pass over a respective 2½ inch nylon pulley attached to one of the trusses 74.

Similarly, the high side cable arrangement 116 includes a 3/16 inch steel main cable 132, three ⅛ inch steel drop cables 134 having one end attached to each confinement ring 108 and the other end attached to the main cable 132, and a winch 136 for reeling in and feeding out of the main cable 132.

Figures 8, 10, 11:
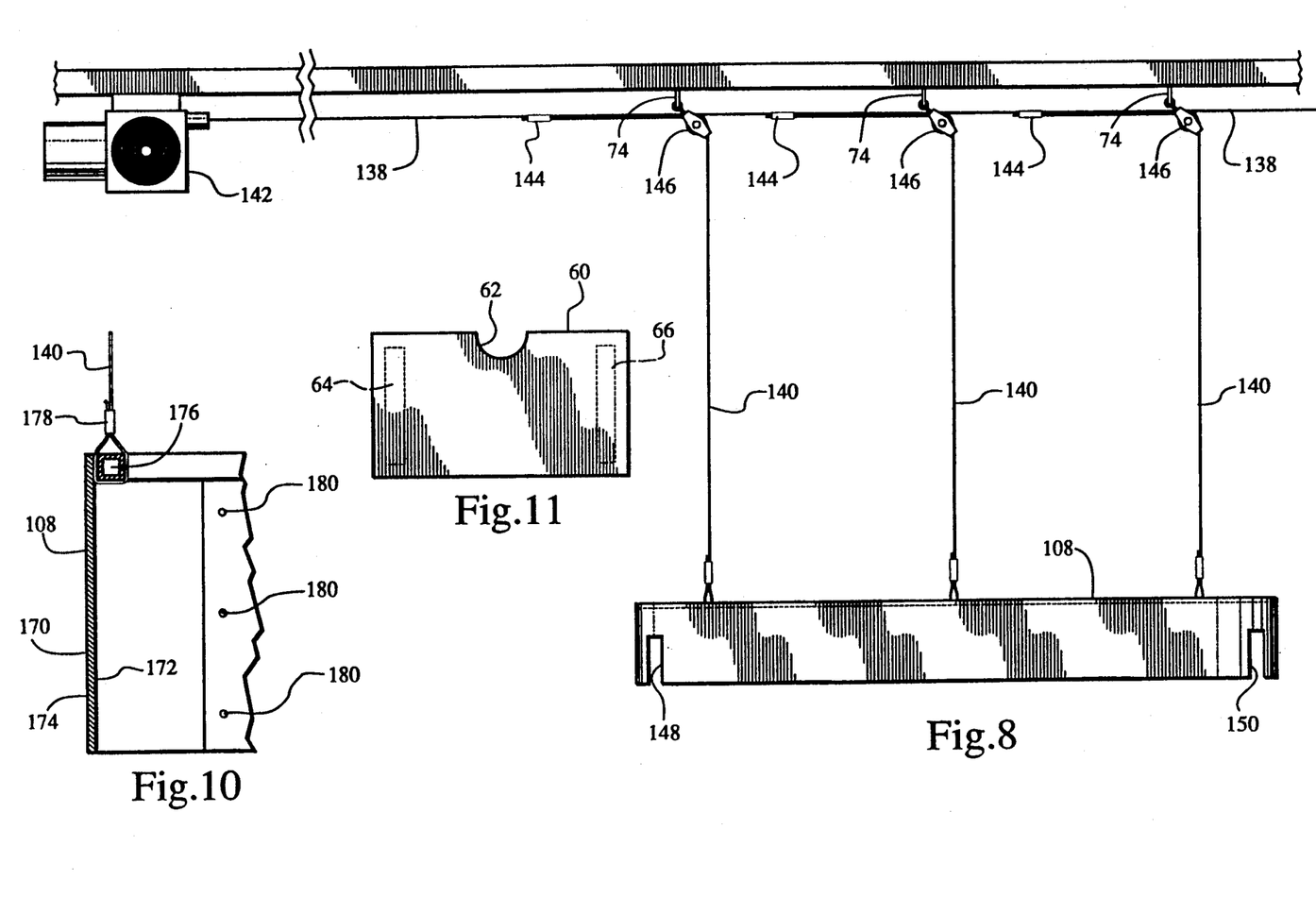
FIG. 8 is a side view representation of a confinement ring and its associated cables, pulleys and winch.
FIG. 10 is an enlarged cross-section representation of a confinement ring and its associated drop cable.
FIG. 11 is a side view illustration of a cover plate of the present invention.

As shown in FIGS. 7 and 8 of the drawings, the low side cable arrangement 118 includes a 3/16 inch steel main cable 138, three ⅛ inch steel drop cables 140, each having one end attached to one side of a confinement ring 108 and the other end attached to the main cable 138, and a winch 142 for reeling in and feeding out of the main cable 138. Although the winch 142 is shown as a motor driven winch in FIG. 8, it is to be understood that manually operated heavy duty overhead or power driven winches having capacities of 2000 or more pounds may be used. With thirteen rings in each row of confinement rings with each ring weighing approximately seventy pounds, each of the winches 124, 130, 136 and 142 is subjected to about 1200 to 1400 pounds of load.

With particular reference to FIG. 8 of the drawings, the low side of the confinement ring 108 is suspended from the trusses 74 by the three drop cables 140, each being connected to the main cable 138 by, for example, a press fitting 144 ahead of a respective drop pulley 146. The main cable 138 is supported by having each of the drop cables 140 pass through one of the nylon pulleys 146 and as such, the main cable 138 need not be supported by its own set of pulleys. Each of the confinement rings 108 includes a cut-out or notch 148 and 150 in each of its curved ends to accommodate the feed line 92.

Figure 9A:
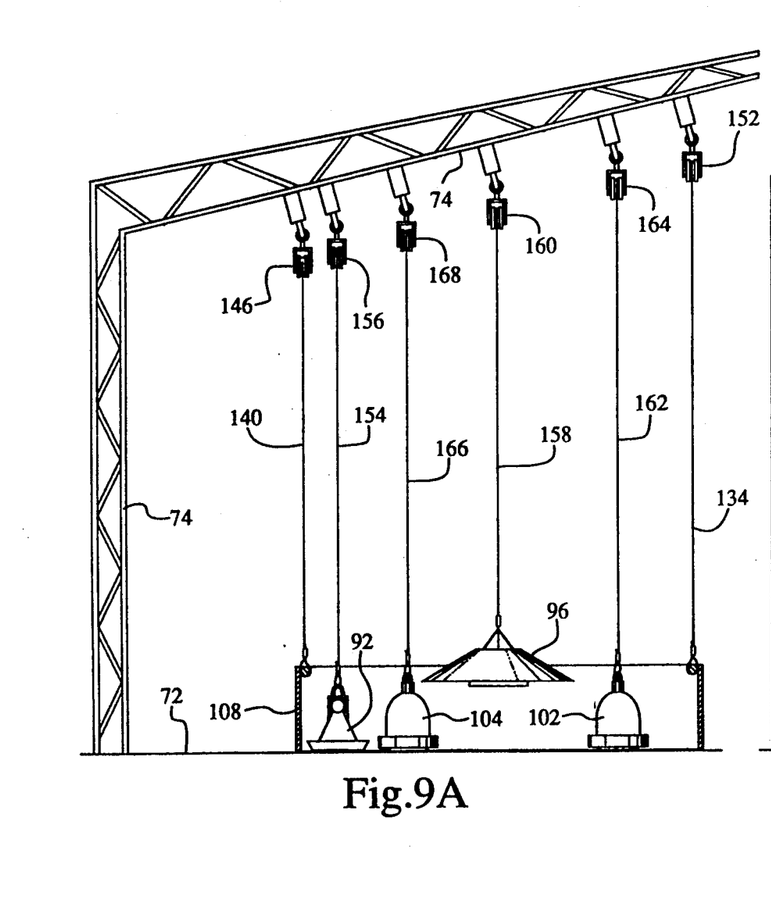
FIGS. 9A and B are schematic cross-section illustrations of a single confinement ring configuration in lowered and raised positions, respectively.

In accordance with the embodiment of FIGS. 6-8 and as shown in more detail in FIGS. 9A and B, each of the confinement rings 108 is attached to respective high side and low side drop cables 134 and 140 supported from the truss 74 by respective 2¼ inch nylon pulleys 152 and 146. Each of the pulleys 152 and 146 may be attached to a respective one of the trusses 74 by use of a loop of 3/16 inch steel cable. The feed line 92 is suspended from the truss 74 by a drop cable 154 and a pulley 156. Likewise, each of the brood heaters or stoves 96 is suspended from the truss 74 by a drop cable 158 and pulley 160. Likewise, the third and fourth rows of waterers 102 and 104 are suspended from the truss 74 by respective drop cables 162 and 166 and pulleys 164 and 168. In as much as the poultry house equipment is arranged in a symmetrical fashion, it should be readily apparent that each of the confinement rings 106 is suspended from the trusses 74 in much the same way as each of the confinement rings 108 is suspended from the trusses 74 by high and low side winch, cable and pulley arrangements.

Figure 9B:
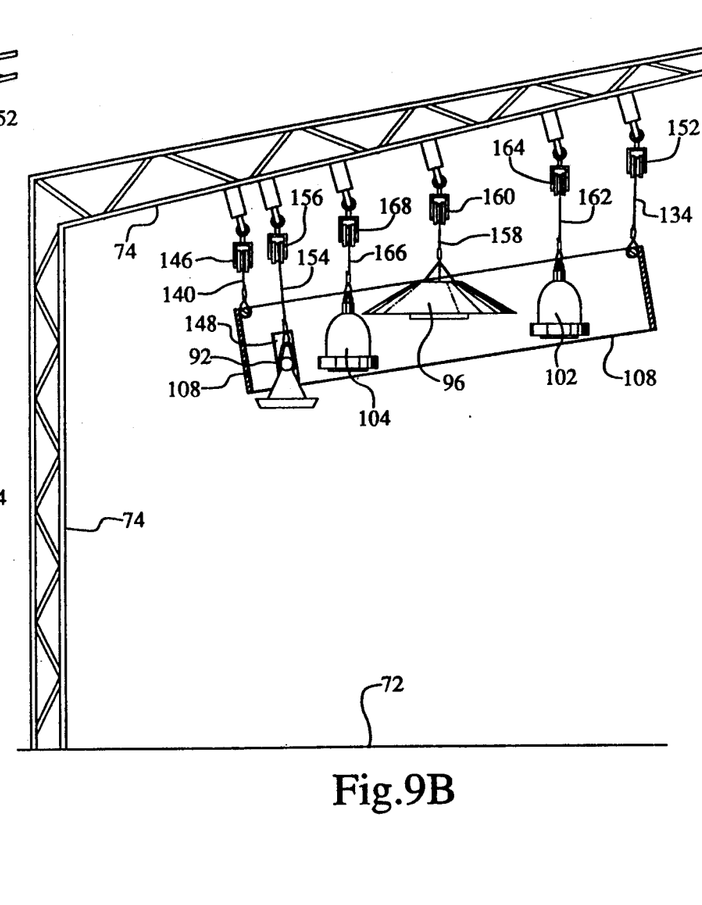

As illustrated in FIG. 9A of the drawings, the confinement ring 108 is shown in its lowered operative brooding position on the floor 72 of the poultry house 70. The confinement ring will be used in this position for the first six to eight days of the brooding cycle. Since each of the drop cables 140, 154, 166, 158, 162 and 134 are connected to different winches, the ring 108 can be raised and lowered independent of the other poultry house equipment. Following the first six to eight days of the brooding cycle, the confinement ring 108 is raised to its storage position up near the ceiling of the poultry house 70 as shown in FIG. 9B. However, the feed line 92, brood heaters 96, and waterers 102 and 104 remain in their lower operative position during the remaining five to six weeks of the brooding cycle. During the warmer months, the brood heaters 96 may be shut off and raised up to their storage position near the ceiling of the brooder house (FIG. 9B).

At the end of the brooding cycle, when the young turkeys are ready to be moved to confinement houses, the feed lines 92, brood heaters 96, and waterers 102 and 104 are raised to their upper storage positions near the ceiling of the brooder house as shown in FIG. 9B. In order to get the feed line 92 to fit up inside of the notch 148 in the confinement ring 108, the high side of the confinement ring 108 is lowered so that the confinement ring is in a horizontal orientation, the feed line is raised up into the notch 148, and then the high side of the confinement ring is raised to its final upper storage position whereat the high side is higher than the lower side of the confinement ring so as to provide as much clearance as possible below the confinement ring to allow equipment such as tractors to operate within the poultry house. With all the equipment in its raised storage position as shown in FIG. 9B of the drawings, the equipment is easily spray washed, sanitized and disinfected so as to prepare the poultry house for the next brooding cycle.

In accordance with the embodiment shown in FIGS. 6-9 and as shown in more detail in FIG. 10 of the drawings, each of the confinement rings 106 and 108 is formed of a sixteen inch high steel band 170 of twenty-nine gauge galvanized steel having baked on enamel interior and exterior surfaces 172 and 174. The interior surface 172 is preferably a light reflective color such as white so that the brooder ring reflects the heat output of the brood heater and thereby reduces the fuel necessary to provide the desired brooding temperature. As such, each of the confinement rings serves as an energy saving device when used in combination with the brood heaters.

A ¾ inch by ¾ inch square steel tube 176 is attached to the upper portion of the inner surface 172 of the steel band 170 to provide added strength to the ring 108 and to define its shape. The frame member 176 is attached to the steel band 170 by, for example, a plurality of metal screws. The frame member 176 also serves as a means for attaching the drop cables to each of the confinement rings. The drop cable 140 is looped around the frame member 176 and attached back onto itself by either a quick adjust type fastener or a permanent press fitting 178. Each of the confinement rings 106 and 108 is approximately twenty-six feet in length, eleven feet in width, and has semi-circular curved ends, each conforming to a semi-circle having an eleven foot diameter. Each of the rings 106 and 108 weights approximately seventy pounds. Each of the steel bands 170 is formed into a continuous ring by overlapping the band on itself approximately two inches and using a plurality of pop rivets 180 to secure the band 170 together.

As shown in FIG. 11 of the drawings, a cover plate or hatch 60 used to cover the opening remaining below the feed tube of the feed line 92 in the feed line accommodating notches 148 and 150 of the confinement rings 106 and 108. In accordance with the preferred embodiment, the cover plate 60 is made of plastic and has a substantially rectangular configuration with a semi-circular depression 62 in the upper edge to accommodate the lower portion of the feed tube. Further, the cover plate 60 has magnetic strips 64 and 66 on the back side of the cover plate near each end for releasably attaching the cover plate 60 to the metallic confinement ring. The cover plates 60 are easily stored on the confinement rings by attaching the cover plates to the confinement ring after it is raised away from the feed lines.

Although it is preferred that each of the confinement rings be constructed of enamel coated galvanized steel, it is contemplated that the confinement rings may be constructed of other materials, such as aluminum, plastic, or any other material which provides the necessary structural rigidity and durability which allows the confinement rings to be permanent poultry house equipment that can be raised and lowered using winch and cable assemblies and is easily cleaned and disinfected for reuse during the next brooder cycle. Further, it is to be understood that the confinement rings may be constructed of ring sections, for example, curved end sections and straight side sections, so that rings of differing lengths may be constructed on sight to accommodate different equipment arrangements.

The poultry house confinement ring system and method of the present invention reduces poultry house set-up time less than two hours, for example, one hour and thirty minutes, for a four hundred-fifty foot brooder house set up as shown in FIGS. 6 and 7, and reduces the time for removal of the rings to just over an hour, for example, one hour and ten minutes, for raising twenty-six confinement rings.

Thus, it will be appreciated that as a result of the present invention, a highly effective poultry house confinement ring system and method is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A brooder confinement system for use in a poultry house having a plurality of feeders, brood heaters, and waterers comprising:
   at least one reusable confinement ring each positioned to surround at least one brood heater, at least one feeder, and at least one waterer, and to rest on the poultry house floor so as to form a brooding shelter for raising young poultry.

2. System of claim 1 wherein said at least one confinement ring is constructed to withstand movement to storage when not in use and cleaning and disinfecting for reuse.

3. System of claim 2 wherein said at least one confinement ring comprises a plurality of rings.

4. System of claim 3 wherein at least one of said rings is substantially circular.

5. System of claim 3 wherein at least one of said rings is substantially oval.

6. System of claim 3 wherein at least one of said rings includes semi-circular ends having equal radii and joined by straight sides.

7. System of claim 3 wherein at least one of said rings is substantially rectangular with rounded corners to prevent the poultry from gathering in the corners.

8. System of claim 3 wherein each of said rings includes a wall having upper and lower edges and interior and exterior surfaces and a support frame attached to the interior surface of said wall near the upper edge thereof.

9. System of claim 8 wherein said wall is formed of a material which is flexible enough along its length to conform to the shape of the support frame and rigid enough along its height to assume a free-standing position on the floor of the poultry house.

10. System of claim 9 wherein said wall is formed of galvanized steel.

11. System of claim 10 wherein said galvanized steel wall has painted interior and exterior surfaces.

12. System of claim 11 wherein the paint on the interior surface is baked-on white enamel.

13. System of claim 12 wherein at least one of said rings includes at least one cutout along its lower edge for accommodating poultry house equipment.

14. System of claim 13 wherein said at least one cutout comprises a pair of cutouts on opposite sides of said ring for accommodating a feed line which passes through said ring.

15. System of claim 13 wherein said ring further includes at least one cover plate for preventing young fowl from exiting said ring through said cutout.

16. System of claim 15 wherein said cover plate includes magnetic strips for releasably attaching said plate to said ring.

17. System of claim 1 further comprising:
   means for raising said at least one confinement ring to an inoperative storage position and for lowering said at least one ring to an operative poultry confining position.

18. System of claim 17 wherein said means for lowering and raising said at least one confinement ring comprises a winch, pulley, and cable arrangement.

19. System of claim 17 wherein each of said rings is operatively connected to at least two winches by a plurality of cables in a manner providing for said ring to be raised up as close as possible to the roof supporting structure of said poultry house to provide maximum clearance for cleaning and working said poultry house.

20. System of claim 19 wherein said at least one reusable confinement ring comprises one ring for every two brood heaters in said poultry house.

21. In a poultry house for raising turkeys, the poultry house having feed, water, and brood heating equipment operatively connected to winches mounted in the roof structure of the poultry house by cables for raising and lowering the feed, water, and heating equipment to a raised storage position when not in use and a lower operative position on or near the floor of the house during use, the improvement comprising:
   a plurality of reusable brooder confinement rings operatively connected to winches in the roof structure of the poultry house by cables for raising and lowering the rings to a raised storage position near the roof structure of the house when not in use and a lower operative position on the floor of the house during use to surround at least one brood heater, at one feeder, and at least one waterer to form a brooding shelter for raising young poultry.

22. Poultry house of claim 21 wherein said rings are made of galvanized steel.

23. Poultry house of claim 22 wherein said rings have an interior surface which reflects heat and thereby serves as a fuel saving device for the brood heating equipment.

24. Method of operating a poultry house having at least one feed line, a plurality of confinement rings, a plurality of brood heaters, a plurality of waterers, a ceiling, a floor, and a plurality of winches, pulleys, and cables for raising and lowering the feed line, confinement rings, brood heaters, and waterers, the rings including opposing cutouts for accommodating the feed line, comprising the steps of:
   starting with a clean poultry house and equipment and with the feed line, brood heaters, and waterers raised to a storage position at or near the ceiling,
   covering the poultry house floor with a layer of particulate material, such as saw dust,
   lowering the at least one feed line down to an operative position on the covered floor,
   lowering the rings down to an operative position on the covered floor with the cutouts positioned over the feed line,
   blocking the cutouts with cover plates to prevent chicks from exiting the rings,
   lowering the brood heaters to operative positions within the rings and near the covered floor, lowering the waterers to operative positions within the rings and on the covered floor.

25. Method of claim 24 further including the step of adding extra hand-filled feed trays in the confinement rings.

26. Method of claim 24 further including the steps of:
approximately six to eight days following lowering of the rings,
setting up plywood partitions on the covered poultry house floor between selected numbers of rings, and
raising the rings to an inoperative storage position near the ceiling.

27. Method of claim 26 further including the steps of:
raising the brood heaters, waterers and feed line to an inoperative storage position near the ceiling,
taking down the plywood partitions, and
cleaning and disinfecting the covered floor and raised rings, feed line, brood heaters, and waterers so as to prepare the poultry house for another cycle of brooding and raising chicks.

* * * * *